United States Patent [19]

Gross et al.

[11] 4,252,252

[45] Feb. 24, 1981

[54] TIMER

[75] Inventors: Thomas B. Gross, Lincoln; William Arzberger, Medfield; Edward Lalumiere, Woburn, all of Mass.

[73] Assignee: Jet Spray Corp., Waltham, Mass.

[21] Appl. No.: 935,179

[22] Filed: Aug. 21, 1978

[51] Int. Cl.³ .............................................. B67D 5/30
[52] U.S. Cl. ..................................... 222/14; 222/70; 222/129.4; 222/148
[58] Field of Search ................................... 222/14–17, 222/20, 36, 37, 70, 129.1, 129.3, 129.4, 148

[56] References Cited

U.S. PATENT DOCUMENTS

| 2,802,599 | 8/1957 | Callahan et al. | 222/129.4 X |
|---|---|---|---|
| 3,133,674 | 5/1964 | Schmaus | 222/129.4 |
| 3,257,033 | 6/1966 | Stott | 222/36 |
| 3,510,026 | 5/1970 | Wright | 222/20 |
| 3,888,390 | 6/1975 | Grau | 222/37 X |

Primary Examiner—Joseph J. Rolla

Attorney, Agent, or Firm—Wolf, Greenfield & Sacks

[57] ABSTRACT

The timer controls a dispensing machine and in particular controls the dispensing cycle for a product such as instant potatoes by temporally regulating the water portion of the cycle in conjunction with the solid or powder (potato granules or pearls) portion of the cycle. The water flow is usually controlled using a solenoid or the like while the quantity of potato is regulated by an auger and associated drive motor. The dispensing cycle is initiated by a pre-rinse period wherein only water flows. During the main part of the cycle both water and product flow into a mixing area. The cycle ends with a post rinse period that is either positive or negative; positive when the product flow stops first and negative when the water flow stops first. For multiple portions, rather than extending the length of the main part of the cycle, the timer provides for repeating the basic cycle a number of times that relates to the desired portion. All periods comprising the overall basic cycle are preferably adjustable in duration.

26 Claims, 2 Drawing Figures

TIMER

BACKGROUND OF THE INVENTION

The present invention relates in general to means for controlling the dispensing cycle of a dispensing machine, and relates, more particularly to control of a dispensing machine which dispenses a product such as instant potatoes or the like wherein there is provided essentially separate control for water flow and product flow.

In dispensing a product such as potatoes, it is common to provide a pre-rinse period wherein only water flows followed by a main portion of the cycle wherein both water and product flow to an end of the cycle. The main portion of the cycle is, of course, significantly longer than the pre-rinse portion. For some applications it is desirable to provide for dispensing of a larger portion of the product. In this case, it is common to simply extend the main portion of the dispensing cycle without substantially effecting the pre-rinse portion or any post rinse portion. However, the end product has not had a totally desirable consistency using this approach of simply extending the main portion of the cycle. Instead, in accordance with the present invention, the timer includes means responsive to the termination of the basic cycle for repeating the basic cycle a predetermined number of times depending upon the desired final portion.

Accordingly, one important object of the present invention is to provide a timer for use in controlling the dispensing cycle for a product to provide improved control of the portion of the product that is being dispensed. In accordance with the present invention, a setting can be made which is readily adjustable to set the desired portion to be dispensed from the dispensing machine.

Another object of the present invention is to provide an improved means for controlling a dispensing cycle so as to permit alternatively a positive or negative post-rinse period; positive when the product flow stops first and negative when the water flow stops first. It has been found that depending upon the type of potato that is being dispensed, it may be desirable to provide either termination of the product, or termination of the water a predetermined time after termination of the product, which predetermined time is adjustable in increments of, for example, 0.2 seconds.

Still another object of the present invention is to provide an improved timer for controlling a dispensing cycle which provides time period adjustability for substantially all portions of the cycle, including the pre-rinse portion, the product and water portions, the post-rinse portion, whether positive or negative, and also the overall total cycle when a repeating cycle is used for larger portions.

SUMMARY OF THE INVENTION

To accomplish the foregoing and other objects of this invention there is provided a timer for controlling a dispensing cycle of a dispensing machine for dispensing a material such as instant potatoes or other materials comprising a product and a liquid to be combined with the product. Means are provided for initiating flow of at least the liquid to start the basic dispensing cycle. Preferably, there is included a bistable means associated with the control of the liquid, the bistable means being in a first position for permitting the flow and the second position for inhibiting the flow. Similarly, there is also a second bistable means associated with the product which permits the flow in one state and inhibits flow in the other state. The timer includes means for signalling the end of the basic dispensing cycle at which time flow is interrupted. In accordance with one feature of the present invention, there is provided a portion means which is preferably settable and which has means associated therewith which is responsive to the end of the basic cycle for essentially reactivating a second primary cycle. This portion means may include a counter and is adapted to provide larger portions by repeating the basic dispensing cycle, a preselected number of times depending upon the size of the portion that is desired. The timer circuit preferably includes a clock means which defines a predetermined clock interval and at least one settable timer circuit operated from the clock signal for defining a pre-rinse period. Circuit means are provided responsive to this settable timer means for initiating product flow a preselected time after initiation of liquid flow. In addition to the settable timer means for the pre-rinse interval, there is preferably also provided a second settable timer means for controlling termination of the product and liquid, and a third settable timer means used for a positive post rinse mode for controlling termination of the liquid a predetermined period of time after termination of the primary product, There is also a further timing circuit that is adjustable over a relatively small interval for controlling the duration of the negative post-rinse interval which provides for termination of the liquid prior to termination of the product flow.

Thus, in accordance with the present invention, another feature is the provision for both a positive post-rinse interval or alternatively a negative post-rinse interval depending upon the nature of the product being dispensed. In this connection, the system of this invention may comprise first means for controlling liquid flow including means for initiating flow of at least the liquid at the beginning of the dispensing cycle, and second means for controlling the product flow. Means are provided for establishing one of the following two conditions; (1) termination of liquid flow before the product flow, (2) termination of liquid flow after product flow. The first condition is referred to herein as a negative post-rinse interval while the second condition refers to a positive post-rinse interval. In accordance with this feature the system also includes means responsive to the first condition including timing means for terminating operation of the first means, followed after a predetermined period, by termination of operation of the second means. Finally, means are provided responsive to the second condition also including timing means for terminating operation of the second means, followed after a predetermined period, by termination of operation of the first means.

DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
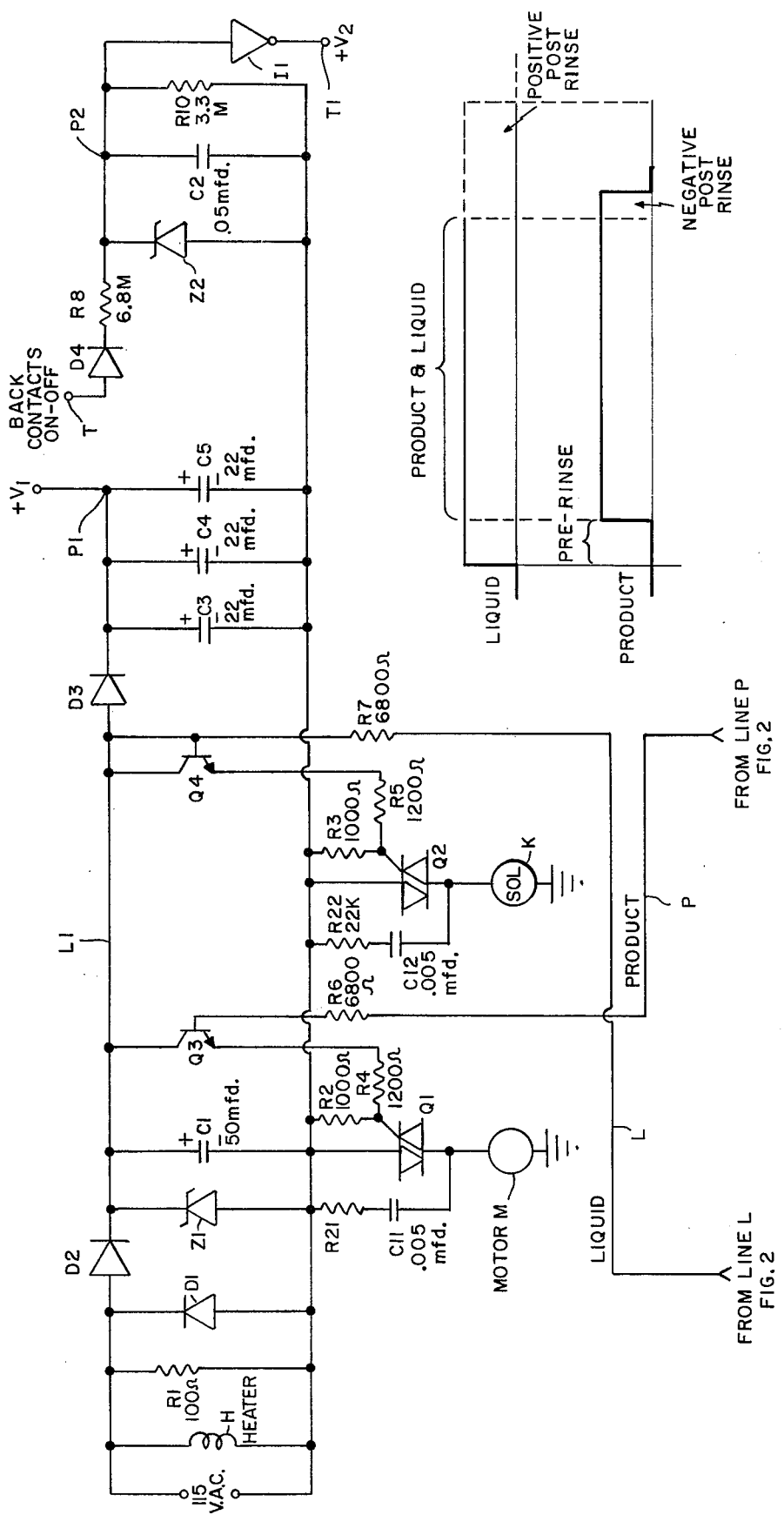
FIG. 1 is a circuit schematic diagram primarily depicting the power supply of the present invention and the control to the water solenoid and gear motor for the auger.
Figure 2:
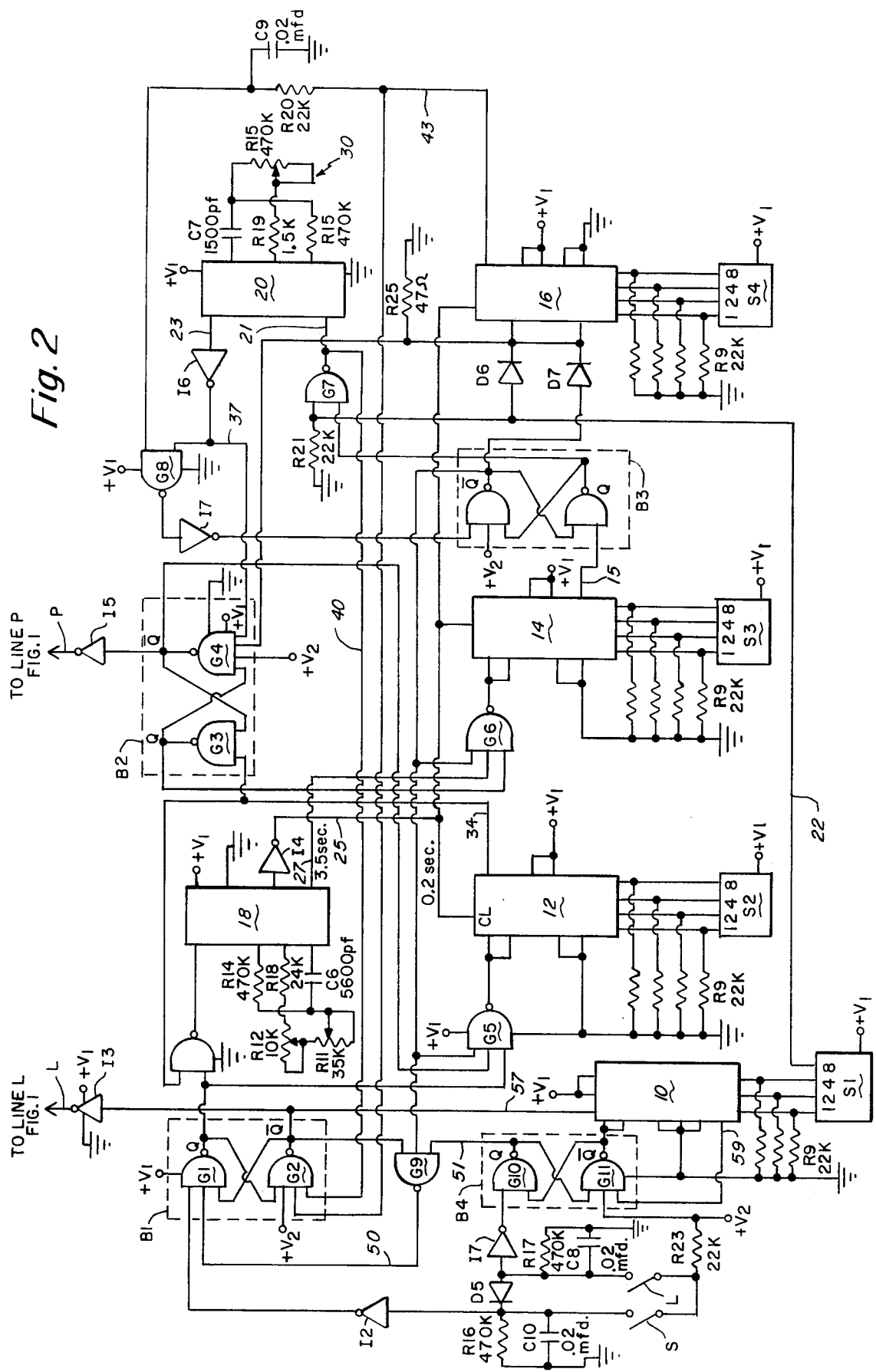
FIG. 2 is a circuit diagram of the control principally of the liquid and product in accordance with the present invention.

FIG. 1 discloses the power supply of the present invention for providing certain voltages such as +V1 and +V2 used with the circuit of FIG. 2. This power supply operates from the 115 VAC line which is shown in FIG. 1 connecting across the parallel combination of heater H resistor R1 and diode D1. This circuit along with diode D2, zener diode Z1 and capacitor C1 comprises a half-wave rectifier circuit providing a relatively constant voltage level on line L1 which couples to the collectors of transistors Q3 and Q4. The transistor Q3 controls the triac Q1 which in turn controls the motor M for the auger not shown in the drawing, but understood to advance the flow of the product to a mixing chamber of the dispensing device, this chamber also receiving water controlled by the solenoid K also depicted in FIG. 1. Solenoid K is controlled from triac Q2 which is in turn controlled by the input transistor Q4. A more stable voltage is provided by means of diode D3 and the parallel arrangement of capacitor C3, C4 and C5 which provides at point P1 a relatively stable logic voltage +V1 used in most of the circuits shown in FIG. 2.

FIG. 1 also shows a terminal T which is actually a back contact of an on/off switch used for coupling the power to the power supply. This switch, although not shown in FIG. 1 is typically connected in series with the 115 VAC line. When the terminal T is at a high level, the circuit including the zener diode Z2 and capacitor C2 provides a voltage at point P2 which is a relatively constant positive voltage which, when coupled by way of the inverter I1 provides a ground or zero voltage at terminal T1. On the other hand, when the input terminal T is at ground or goes to ground, then there is a positive level on the order of 10 volts at terminal T1. The use of the voltage +V2 from the circuit is discussed in more detail with reference to the diagram of FIG. 2.

In FIG. 1 there are two lines L and P which may be referred to as the liquid and product lines, respectively. When there is a high level signal on line L transistor Q4 is caused to be conductive providing a driving current by way of resistor R5 to the gate of the triac Q2 causing the triac to conduct and energize the solenoid K to permit water flow. When the level on line L is low, the triac Q2 is turned off, which in turn turns off the solenoid K interrupting the water flow. The signal on the product line P operates similarly, and when this signal is high, the transistor Q3 is conductive and the triac Q1 is on operating the motor M. When the signal on line P goes to its low state, then the motor operation ceases.

FIG. 2 shows the control in accordance with the present invention for providing signals to the lines L and P coupling between the circuitry of FIGS. 1 and 2. There is a first bistable device B1 for controlling line L and a second bistable device B2 for controlling signals to the line P. The bistable device B1 includes a pair of NAND gates G1 and G2 cross-coupled in a bistable configuration. Similarly, the device B2 comprises a similar pair of gates G3 and G4 also intercoupled in a bistable condition.

The circuit of FIG. 2 also includes switches S and L for controlling, respectively, small and large portions as described in further detail hereinafter. There are a number of timing devices shown in FIG. 2 which are identified more specifically in a table that follows. These devices include timers 10, 12, 14, 16, and the main clock 18, and a second clock or timer 20. The devices 10, 12, 14 and 16 may be of one type while the devices 18 and 20 may be of a different type. Associated with the timers 10, 12, 14 and 16 are switches S1, S2, S3 and S4, respectively. The switch S1 actually provides two functions, with one output to line 22 being settable in one of two different states, typically either a high state or a low state for determining whether the post-rinse is positive or negative. In the embodiment of FIG. 2 for a positive post-rinse, the line 22 is at its low level whereas for a negative post-rinse the line 22 is at its high level. The other three outputs from switch S1 couple to three inputs of the timer 10. These three inputs determine in a binary coded decimal fashion, an initial count to which the device 10 is initially set. Hereinafter, there is a further discussion of the operation of the timer 10 in conjunction with a repeating cycle in accordance with the control for providing larger portions.

The switch S2 has four outputs and may be set in 16 different positions for providing a binary coded decimal signal to four corresponding inputs to the timer 12. The switches S3 and S4 are similarly connected to the timers 14 and 16, respectively. The switch S2 controls the pre-rinse period in conjunction with the timer 12. This switch is preferably operated through ten positions even though they have the capability of more positions. In one embodiment this timer 12 and associated switch S2 may vary the pre-rinse period from zero to 1.8 seconds in 0.2 second increments. The switch S3 controls the duration of product and water and the control is such that there is provided a minimum period of 3.5 seconds, for example, even with the switch S3 set at its zero position. From this zero position, the interval can be expanded up to a total period of 5.3 seconds again at 0.2 second intervals, for example. The switch S4 controls the duration of the positive post-rinse period in association with the timer 16. Again, because of the common input clocking to devices 12, 14 and 16 from line 25 of device 18, the positive post-rinse period may also be varied from zero up to, for example, 1.8 seconds in 2 second increments. The circuit 30 associated with the timer or clock 20 and including the potentiometer R15 is adapted to set the negative post-rinse period when in that mode of operation. Typically, this period is set between 0.25 and 0.5 seconds.

First, operation is considered through one basic cycle which includes a pre-rinse period, a main period, and a post-rinse period. It is also assumed that the circuit is conditioned for a negative post-rinse rather than a positive post-rinse. Thus, the circuit controls lines L and P to terminate liquid prior to termination of product.

When the switch S is closed and assuming that the circuit has been powered, a positive signal is coupled to the inverter I2. This signal may be low pass filtered by means of the circuit including resistor R16 and capacitor C10. This high level signal is inverted by inverter I2 to a low level signal which sets the bistable device B1 causing a low level signal on its output $\overline{Q}$. This signal is inverted by inverter I3, causing a positive driving voltage on line L which, as previously discussed, causes operation of the solenoid K to initiate water flow to the mixing chamber of the dispensing machine. The output Q from device B1 couples to the NAND gate G5 providing at the output thereof a low level signal coupled to the timer 12 for initiating a count down of the timer 12, from an initial count set by the switch S2. The low level signal to the timer 12 from gate G5 essentially lifts a reset condition so that the timer 12 can be clocked from line 25 which couples in turn by way of inverter 14 from an output of the basic clock 18. Thus, the timer 12 is counted down at the basic clock rate of, for example, 0.2 seconds. During the counting down sequence, the output on line 34 from the timer 12 is high but once the timer 12 has counted down, the output on line 34 changes to a low level signal which is coupled to the bistable B2 for setting the bistable device. When this occurs, there is a low level signal on the output $\overline{Q}$ which provides a high level drive signal through inverter I5 to the line P. As discussed previously, this signal causes energization of the motor M of FIG. 1 thus initiating product flow. Thus, it can be seen that the duration of the count down of timer 12 determines the period between initiation of the liquid by a high signal on line L and initiation of the product by a high signal on line P. It is the resetting of the devices B1 and B2 at the respective gates G2 and G4 that determines the termination of the liquid and product flow.

The enabling of gate G5 is also of course conditioned upon its two other inputs being at their high levels which means that the timer 12 can only be initiated when the flip-flop B2 is reset and the flip-flop B3 is also reset. The flip-flop B3 may be referred to as a post-rinse latch. This device B3 is operated from the output of the timer 14 as discussed in more detail hereinafter.

The timer or clock 18 in addition to providing the basic clock signal at a period of 0.2 seconds also has an output on line 27 which represents a clock of longer duration such as 3.5 seconds. This signal which couples by way of line 27 to the NAND gate G6, enables this gate but only after the fixed interval of 3.5 seconds which represents a fixed minimum interval over which both the liquid and product are dispensed. The timer 14 essentially times from this initial basic interval of, for example, 3.5 seconds. The other inputs to gate G6 are valid when the bistable device B2 is set meaning the product is being dispensed, and further when device B3 is reset.

After the termination of the 3.5 second minimum interval determined by the output on line 27 from device 18, the device 14 is then enabled by way of gate G6 and this device receives clock pulses from line 25 to decrement the device 14 from an initial count set by the switch S3. It is noted that at the end of the 3.5 second interval, there is no resetting of bistable devices B1 or B2. It is only at the end of the time interval as determined by the 3.5 seconds and the time of device 14 that further resetting action occurs by way of a signal on the output line 15 from device 14 which couples to the bistable device B3 for setting device B3 to provide a high level output on its Q output and a low level on its $\overline{Q}$ output. The resetting of the devices B1 and B2 is now dependent upon whether the circuit is set in the positive or negative post-rinse mode. As previously assumed, in the negative mode, the line 22 is high thus providing a high enabling signal to the gate G7 which is a NAND gate. Because the bistable device B3 is also now set, the gate G7 has both of its inputs high thus providing a low level signal on line 21 which initiates operation of the clock 20. During the timing interval of the clock 20 the output line 23 is normally low but will go to its high state at the end of the interval determined by circuit 30. When this occurs, the output from inverter I6 is low thus resetting by way of line 37 the bistable device B2 causing termination of the product. However, prior thereto and at the time that the bistable device B3 sets, a low level signal at the output of gate G7 on line 40 couples to gate G2 to reset the bistable device B1 thus terminating liquid flow first. After the liquid flow has terminated, then product flow terminates a short time thereof in the range of 0.25 to 0.5 seconds by the signal on line 37 from the device 20. The range of the negative post cycle is determined by adjustment of the potentiometer R15 of circuit 30.

When the bistable device B2 is reset by the signal on line 37, the signal from inverter I6 also couples to gate G8 causing a high level output therefrom which is inverted from inverter I7 to a low level signal coupled to the bistable device B3 for causing a resetting thereof thus signalling an effective termination of the basic cycle.

The device 16 is not operated in the negative post-rinse mode because in that mode, the line 22 is high holding the device 16 reset by way of the input to the device via diode D6. The diodes D6 and D7 effectively form a gate wherein the device 16 is permitted to time out only when both of these diodes are reverse biased by low level signals at the input anode of each diode.

For a sequence of operation wherein the control is set for a positive post-rinse interval rather than a negative post-rinse interval, the line 22 is set to its low state by means of a setting of the switch S1. This low signal by way of gate G7 effectively disables the clock 20 by maintaining the line 21 at the input to the clock at a high level. For the positive post rinse mode, the initial portion of this cycle may be the same as with the negative post-rinse mode. Thus, after the timer 14 times out and the device B3 is set there is no action by way of the gate G7 but the low output signal from the device B3 at its output $\overline{Q}$ reverse biases diode D7. Because this is the positive mode, both diodes D6 and D7 are reverse biased providing a low input to the timer 16 causing the timer to count down in accordance with the setting of switch S4. The switch S4 determines the duration of this post-rinse interval. When the timer 16 has timed out, there is a signal on line 43 at the output of the timer which goes from a normal high level to a resetting low level at time out. This low level signal is coupled all the way over to the gate G2 of the device B1 causing a resetting of this device. This resetting, however, only occurs at the end of the post-rinse period. Before the resetting of device B1, device B2 is reset directly upon setting of the post-rinse latch B3. It is noted that the cathodes of diodes D6 and D7 couple by way of line 45 to the gate G4. Thus, when the cathodes of these diodes go to ground, because both diodes are reversed biased, then line 45 goes low resetting the bistable flip-flop type device B2. In summary, for the positive post-rinse mode of operation, after the main portion of the cycle is completed, the device B3 is set, and at the same time the device B2 resets interrupting further product flow. The device 16 then times out, defining the duration of the post-rinse interval and at the termination of the interval the device B1 is reset to, at that time, terminate liquid flow. The duration of this positive post-rinse interval is controlled by the switch S4 which can be put into a number of different positions for providing a post interval of anywhere from zero to 1.8 seconds in 0.2 second increments, for example.

When the device 16 times out, as previously mentioned, the line 43 goes to its low state and there is a delayed signal coupled by way of resistor R20, delayed by capacitor C9, to one input of gate G8 causing the output of gate G8 to move to its high state causing a low output from device I7 which causes a resetting of the post-rinse latch B3.

At this time operation has been discussed with reference to a single basic cycle of operation. However, it is noted that the setting of the device B1 which initiates substantially all operation, can also be accomplished by way of a second line 50 rather than by way of the inverter I2. A low level signal can be provided on line 50 at the output of gate G9 where all of the inputs are at their high level. One of the inputs to the gate G9 indicates that the device B1 is reset while another one indicates that the device B3 is reset. The third input 51 couples from a further bistable device B4 which comprises the gates G10 and G11 both of which are NAND gates including the conventional cross-coupling to provide the bistable operation. Thus, the lines 51 essentially controls the recycling operation as long as a previous liquid phase has been completed and as long as the post-rinse latch has been reset.

As previously mentioned, the switch S1 has three outputs which couple to the timer 10 for providing a binary coded decimal input. When the operator of the machine closes the switch L to select a larger portion rather than the switch S there is a positive signal coupled by way of the diode D5 to the inverter I2 for initiating the operation by setting the bistable device B1. At the same time this signal is inverted by inverter I7 to set the bistable device B4 so that the line 51 is at its high, enabling level which enable a repeat cycle by again setting the device B1. Each time that the device B1 is set, there is a counting signal on line 57 to the device 10 to count the device down. This counting operation continues for as long as the device B4 is in its set state with a low level signal coupling from the $\overline{Q}$ output of gate G11 to the device 10. The output from device 10 is on line 59 and is normally at a high state during count down of the device 10. However, when the device B1 is set for its last cycle so that the timer 10 now times out, the line 59 goes to its low state resetting the bistable device B4 and reverting the line 51 from the device to its low level, thereby inhibiting any further resetting on line 50 of the bistable device B1. Before the device 10 is clocked down to its resetting position, line 51 is maintained in its high state because the device B4 has not yet been reset and thus each time that the latch B3 is reset with the device B1 also being reset, there is a repeat level on line 50 for reactivating or reinitiating the next cycle. Again, this action commences with the device 10 being clocked via line 57 each time that a new cycle commences as signalled by a setting of the bistable device B1. The switch S1 may be set so that the device 10 counts only once or so that the device counts any predetermined number of times to repeat the basic cycle for providing larger portions. Upon a repeat of a basic cycle depending upon whether in positive or negative post-rinse mode, the liquid and product are again dispensed usually with a pre-rinse period of liquid only during each basic cycle that is repeated. This technique has produced extremely uniform consistency of the final product and much better consistency then can be obtained by varying the length of the main portion of the cycle such as by varying the output signals from the basic clock 18 to extend the 3.5 second interval, for example.

Below is a list of specific components as to their value and type used in the circuits of FIGS. 1 and 2.

C1—Aluminum Electrolytic, 50 mfd., 16 volt working Sprague 506G016CB7: TVA-1150; TE-1160 or Cornell-Dubilier type NLW50-16.
C2—Ceramic, 0.05 mfd, 20 volt, Centralab UK20-503.
C3–C5—Tantalum 22 mfd. 16 volt, TA07E226KB.
C6—Polystyrene, 5600 pf, 160 volt, Mallory SXM256.
C7—Polystyrene, 1600 pf, 160 volt, Mallory SXM215.
C8–C10—Ceramic, 0.02 mfd. 20%, 16 volt, Centralab UK16-223.
C11–C12—Ceramic, 0.005 mfd. GMV, 1600 volt, Centralab DD-16-502.
D1–D3—Diodes, 1N4001.
D5–D7—Diodes, 1N4148.
D4—Diodes, 1N4004.
Q1–Q2—Triacs, 400 volt, RCA T2301D/P.
Q3–Q4—Transistors, NPN, 2N5172, 18 and 20 CMOS 4060BE, 10, 12, 14, 16 CMOS 4029BE.
R1—1 watt, 100 ohm 10% (remove for 220 volt line).
R2-3—¼ watt, 1000 ohm 10%.
R4-5—¼ watt, 1200 ohm 10%.
R6-7—¼ watt, 6800 ohm 10%.
R8—½ watt, 6.8 megohm 20%.
R9—15 element network, 22,000 ohm, Allen Bradley AB 316A.
R10—¼ watt, 3.3 megohm 20%.
R11—Control, 35K ohm, 2 watt, RY4NAYSD353A.
R12-13—Control, 10K ohm, ¼ watt.
R14-17—¼ watt, 470 k ohm, 10%.
R18—¼ watt, 24K ohm, 5%.
R19—¼ watt, 1.5K ohm, 5%.
R20—¼ watt 22k ohm, 10%.
R21-23—¼ watt 22k ohm, 10%.
R24-25—¼ watt composition 47 ohm 10% (must open within 10 seconds with ¼ ampere).
S1—DIP 4PST.
S2 & S3—Binary 16 position EECO 210033G.
S4—Binary 10 position EECO 210002G.
Z1—1 watt, 10 volt, zener 1N4740.
Z2—400 milliwatt, 10 volt zener, 1N961 or 1N4740.

Having described one embodiment of the present invention it should now become apparent to those skilled in the art that numerous other embodiments are contemplated as falling within the scope of this invention. For example, specific timing and clock devices have been shown in FIG. 2. However, other types of devices may be substituted therefor for defining the different predetermined time intervals. Also, the logic circuitry could be provided using alternate gate constructions. Moreover, the increments may be other than in 0.2 second intervals and in fact in an actual version the intervals may be 0.21875 seconds corresponding to the minimum period of 3.5 seconds.

What is claimed is:
1. A timer for controlling a dispensing cycle of a dispensing machine including at least an initial basic dispensing cycle and for dispensing a product comprised of a liquid and a primary product, said timer comprising;
means for initiating flow of the product to start the basic dispensing cycle including clock means defining a clock signal, at least one set-table timer means operated from the clock signal and defining a pre-rinse period, and means responsive to the settable timer means for initiating primary product flow a preselected time after initiation of liquid flow, means for signalling the end of the basic dispensing cycle at which time the flow of at least one component of the product is interrupted, and means responsive to said means for signalling for reactivating the means for initiating flow through at least one repeat basic cycle.

2. A timer as set forth in claim 1 wherein said means for initiating flow includes first bistable means for controlling liquid and second bistable means for controlling primary product, said means for signalling including timer means and said means responsive for reactivating including at least a counter means operated from the first bistable means.

3. A timer as set forth in claim 1 including a second settable timer means operated from the clock means and means responsive to the second settable timer means for controlling termination of one of the primary product flow and liquid flow.

4. A timer as set forth in claim 3 including means for setting one of positive and negative post-rinse and a third settable timer means operated from the clock means and means responsive to the third settable timer means and the means for setting for controlling termination of the liquid a preselected period of time after termination of the primary product.

5. A timer as set forth in claim 1 including means for setting one of positive and negative post-rinse and a second settable timer means operated from the clock means and means responsive to the second timer means and the means for setting for controlling termination of the liquid a preselected period of time after termination of the primary product.

6. A timer as set forth in claim 5 including a negative post rinse circuit and means responsive to the means for setting being in a negative post rinse position for operating the negative post rinse circuit to terminate liquid a preselected period of time before termination of the primary product.

7. A timer for controlling a dispensing cycle of a dispensing machine for dispensing a substance comprising a product and a liquid to be combined with the product, said timer comprising;

first means for controlling liquid flow including means for initiating flow of at least the liquid at the beginning of the dispensing cycle, second means for controlling the product flow including timer means defining a pre-rinse period and means responsive to said timer means for initiating product flow a preselected time after initiation of liquid flow, means for establishing one of the following two conditions,
(1) termination of liquid flow before product flow,
(2) termination of liquid flow after product flow, means responsive to said first condition including timing means for terminating operation of the first means, followed after a predetermined period, by terminating operation of the second means, and means responsive to said second condition including timing means for terminating operation of the second means, followed after a predetermined period, by terminating operation of the first means.

8. A timer as set forth in claim 7 wherein said timer means includes clock means and a settable timer circuit operated from the clock means.

9. A timer as set forth in claim 7 wherein said first means includes first bistable means for controlling liquid flow and said second means includes second bistable means for controlling product flow.

10. A timer as set forth in claim 7 wherein said second condition timing means includes positive post rinse means comprising a counter means.

11. A timer as set forth in claim 7 wherein said first condition timing means includes negative post rinse means comprising a timing circuit.

12. A timer as set forth in claim 11 wherein said second condition timing means includes positive post rinse means comprising a counter means.

13. A timer as set forth in claim 12 wherein said counter means is settable to different lengths of positive post rinse.

14. A timer for controlling a dispensing cycle of a dispensing machine for dispensing a product, said dispensing cycle including at least an initial basic dispensing cycle, said timer comprising;

means for initiating flow of the product to start the basic dispensing cycle, said product comprising at least a liquid and a primary product, means for signalling the end of the basic dispensing cycle at which time the flow of product is interrupted, and means responsive to said means for signalling for reactivating the means for initiating flow through at least one repeat basic cycle, said means for initiating flow including first bistable means for controlling liquid and second bistable means for controllng primary product, said means for signalling including timer means and said means responsive for activating including at least a counter means operated from the first bistable means.

15. A timer as set forth in claim 14 wherein said timer means includes a presettable timer device responsive to said second bistable means for initiating a product and liquid period.

16. A system for controlling a dispensing cycle of a dispensing machine for dispensing a product, said system comprising;

means for initiating flow of the product to start the dispensing cycle including a first timing means demarcating a presettable timing period and means terminating product flow at the end of said timing period, counting means responsive to said means for initiating for counting from a base number to a cycle terminating number, and means responsive to said counting means for reactivating said timing means at the end of each timing period through a predetermined number of basic timing periods as determined by said counting means.

17. A system as set forth in claim 16 including clock means defining a clock signal coupled to said first timing means, said first timing means including presettable timer means.

18. A system as set forth in claim 16 wherein said product includes liquid and a primary product and said first timing means includes means defining a liquid timing period and means defining a primary product timing period.

19. A system as set forth in claim 18 including a pre-rinse timer and means responsive to the pre-rinse timer for providing initiation of the primary product timing period a predetermined period of time after initiation of the liquid timing period.

20. A system as set forth in claim 18 including a post rinse timer and means responsive to said post rinse timer for providing termination of the primary product timing period before termination of the liquid timing period.

21. A system as set forth in claim 18 including a post rinse timing circuit and means responsive to the post rinse timing circuit for providing termination of the primary product timing period after termination of the liquid timing period.

22. A method of controlling a dispensing cycle of a dispensing machine that dispenses a product, said method comprising the steps of;
 initiating flow of the product to start the dispensing cycle,
 providing means for defining a basic presettable timing period during which the product is dispensed,
 terminating product flow at the end of the basic timing period,
 providing means for counting through a predetermined number of basic periods to a final predetermined number with flow being re-initiated after termination and in response thereto for said predetermined number of periods and then finally terminating flow upon reaching the final predetermined number.

23. A method as set forth in claim 22 including providing a product of liquid and a primary product and initiating flow of the liquid a preselected period of time before initiating flow of the primary product.

24. A method as set forth in claim 23 including terminating, in a basic cycle, in one mode of operation, product flow before liquid flow, and in another mode of operation, liquid flow before product flow.

25. A system for controlling a dispensing cycle of a dispensing machine for a product comprising;
 first timing means demarcating a basic timing period during which product is dispensed including means for initiating the timing period and a manually settable timer including digital controls capable of setting the timing period in digital increments,
 counting means responsive to termination of the basic timing period for counting out a predetermined number of counts corresponding to a total dispensing period,
 and means responsive to said counting means for cyclically reactivating said timing means at the end of each basic timing period through said predetermined number of counts as determined by said counting means.

26. A system as set forth in claim 25 wherein said counting means includes a manually settable counter including digital controls capable of setting the number of counts for the extended cycle.

* * * * *